J. F. ANDERSON.
EXHAUST BOX.
APPLICATION FILED JAN. 31, 1921.

1,417,224.

Patented May 23, 1922.
6 SHEETS—SHEET 3.

INVENTOR
John F. Anderson.
BY
Harry C. Schroeder
ATTORNEY

J. F. ANDERSON.
EXHAUST BOX.
APPLICATION FILED JAN. 31, 1921.

1,417,224.

Patented May 23, 1922.
6 SHEETS—SHEET 4.

Inventor.
John F. Anderson.

By Harry Schroeder
Attorney.

J. F. ANDERSON.
EXHAUST BOX.
APPLICATION FILED JAN. 31, 1921.

1,417,224.

Patented May 23, 1922.
6 SHEETS—SHEET 5.

Inventor.
John F. Anderson.
By Harry C. Schroeder
Attorney.

J. F. ANDERSON.
EXHAUST BOX.
APPLICATION FILED JAN. 31, 1921.

1,417,224.

Patented May 23, 1922.

Inventor.
John F. Anderson.

By Harry C. Schroeder
Attorney

UNITED STATES PATENT OFFICE.

JOHN F. ANDERSON, OF OAKLAND, CALIFORNIA.

EXHAUST BOX.

1,417,224.  Specification of Letters Patent.  Patented May 23, 1922.

Application filed January 31, 1921. Serial No. 441,211.

*To all whom it may concern:*

Be it known that I, JOHN F. ANDERSON, a citizen of the United States, residing at Oakland, in the county of Alameda and State of California, have invented certain new and useful Improvements in Exhaust Boxes, of which the following is a specification.

My invention is an improved exhaust box or sterilizer in which filled containers of fruit or other foods are conveyed through a heated chamber of minimum length in a maximum length of time, or in the same length of time required for cans to pass directly through a chamber twenty times as long as the chamber of my machine, thus reducing the space occupied by the machine and enabling the cans to be thoroughly heated and the air effectively expelled therefrom prior to being capped and hermetically sealed.

My invention contemplates means for intermittently rotating and conveying the cans through the chamber.

In my machine there are no chains, cables or disks, extending through the chamber or other weak parts, and the general construction of the machine insures strength and durability.

In the operation of my machine the whole circular chamber is traversed by the containers, thus giving a more perfect circulation of the steam or heat and effecting a material saving of steam. The containers are moreover heated in less time.

In this specification and the annexed drawings, I disclose my invention in the form which I consider the best, but I do not limit my invention to such form because it may be embodied in other forms, and it is to be understood that in and by the claims of this specification I intend to cover my invention in whatever form it may be embodied.

Referring to the drawings.

In the drawings 1 indicates a frame which includes two longitudinal base beams 2 and triangular end upright members 3 and 4 which rest at two corners upon the ends of said base beams. On said end upright members at their uppermost corners are horizontal bearings 5 and 6 respectively. Upon the frame 1 between the end members 3 and 4 is mounted a steam heating drum 7 into which steam is introduced through a pipe 8. A reel 10 is rotatably mounted within the drum 7 eccentrically above the centers thereof by means of trunnions 11 and 12 journaled in the bearings 5 and 6, which trunnions project centrally from the reel spiders 13 and 14 at the ends of the reel, the ends of corresponding arms of said spiders being fitted on the respective ends of longitudinal rods 15. On the rods 15 are pivotally suspended can shelves 16 which include U-shaped members 17 pivotally suspended at one end on said rods, and U-shaped bars 18 supported longitudinally of the reel on the lower horizontal arms of said members. Plates 19 are pivotally balanced transversely on rods 15 so that they always rest directly over the bars 18 to prevent dirt and condensation from entering the open containers. A driven shaft 20 is journaled in bearings 21 and 22 on the frame member 3, which shaft is driven by a power shaft 23 through a clutch 24. On the shaft 20 is secured a pinion 25.

Figure 12:
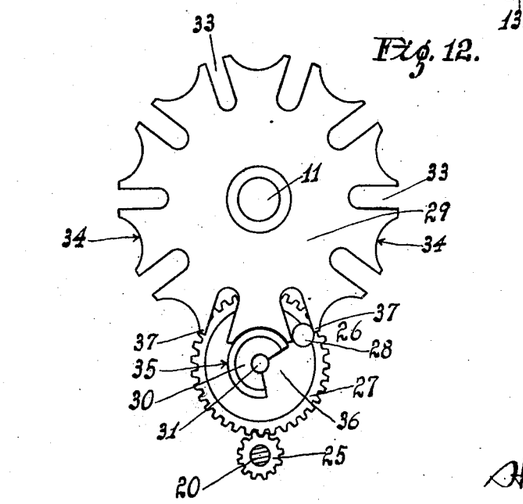
Figure 12 is an end view of the intermittent reel drive gear.
Figure 13:
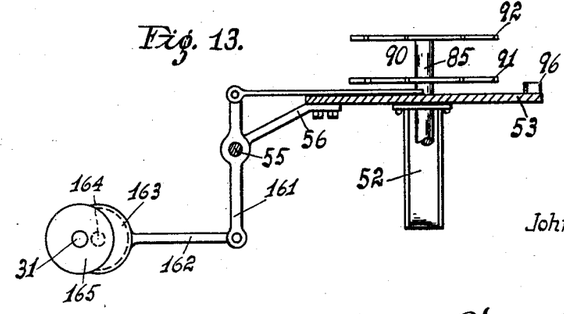
Figure 13 is a cross section of the intake mechanism taken on line 13—13 of Figure 4.

The reel 10 is intermittently rotated by an intermittent movement 26 which includes a gear 27, a pin 28 on said gear, a slotted wheel 29 secured on trunnion 11, and a stud 30 secured to the shaft 31 on which shaft the gear 27 is secured, said shaft being journaled in bearings 32 on the frame member 3 with said gear meshing with pinion 25. The wheel 29 is provided with radial slots 33 extending inwardly from its periphery which slots receive the pin 28 whereby the wheel is rotated intermittently. The wheel 29 is provided in its periphery with arcuate notches 34 between the slots 33 to receive the partly cylindrical surface 35 of the stud 30 whereby the wheel is intermittently locked against rotation, the stud being provided with a longitudinal groove 36 to receive the points 37 of the wheel to permit the intermittent movement thereof.

In bearings 38 and 39 in the lower right corners of frame members 3 and 4 is journaled a shaft 40 which extends longitudinally of the machine. On the shaft 40 is secured a beveled pinion 41 which meshes with a bevel pinion 42 secured on the lower end of a vertical shaft 43 journaled in a vertical bearing 44 on the frame member 3. On the shaft 31 is secured a sprocket 45 and on the left end of shaft 40 is secured a sprocket 46 over which sprockets travels a chain 47 whereby the shaft 40 is driven from the shaft 31. From the upper end of bearing 44 projects an arm 51 horizontally to the right. To the arm 51 is secured a bracket which supports a table 53 extending to a short distance of the left end wall of drum 7 and at an elevation corresponding to the lower edge of an intake opening 54 in said end wall. A horizontal shaft 55 extending parallel to shaft 25 is journaled in brackets 56 secured to the left side edge of the table 53, which shaft carries a sprocket 57 over which travels a chain 58 which also travels over a sprocket 59 secured to the shaft 20. To the forward end of shaft 55 is secured a bevel gear 60 which meshes with a bevel gear 61 secured on a shaft 62 journaled in bearings 63 secured to the underside of table 53. On the shaft 62 is secured a sprocket 64 between bearings 63. A conveyor chain 67 which travels over the sprocket 64 conveys the filled cans onto the outer end of table 53. A vertical shaft 80 is journaled in a bearing 81 on bracket 52 and in a plate 82 secured to the left side edge of table 53, on which shaft is secured a bevel gear 83 which meshes with a bevel gear 84 secured on the inner end of the shaft 55 whereby the shaft 80 is driven from the shaft 55. A vertical shaft 85 extends through table 53 and is journaled in said table and in a bearing 85' on the bracket 52. On the lower end of shafts 80 and 85 are secured sprockets 86 and 87 respectively, over which sprockets travels a chain 88 whereby the shaft 85 is driven from the shaft 80. A transfer device 90 for transferring the cans from chain conveyor 67 to the rear end of table 53 includes a pair of star wheels 91 and 92 secured to the shaft 85 one above the other in alignment with each other above the table 53. On the upper end of shaft 80 is secured a disk 93 to which is connected one end of a can ejector rod 94 which extends loosely through a swiveled pivot 95 on the table 53 between the star wheels 91 and 92 rearwardly of the shaft 85. A guide 96 is secured on top of the table 53 extending from the right side of conveyor 67 to the rear end of table 53 to guide the cans while being transferred by the transfer device 90 and forming the right wall of a guideway 97 at the rear of the table 53. A guideway 98 is located at the left of guideway 97.

Figure 1:
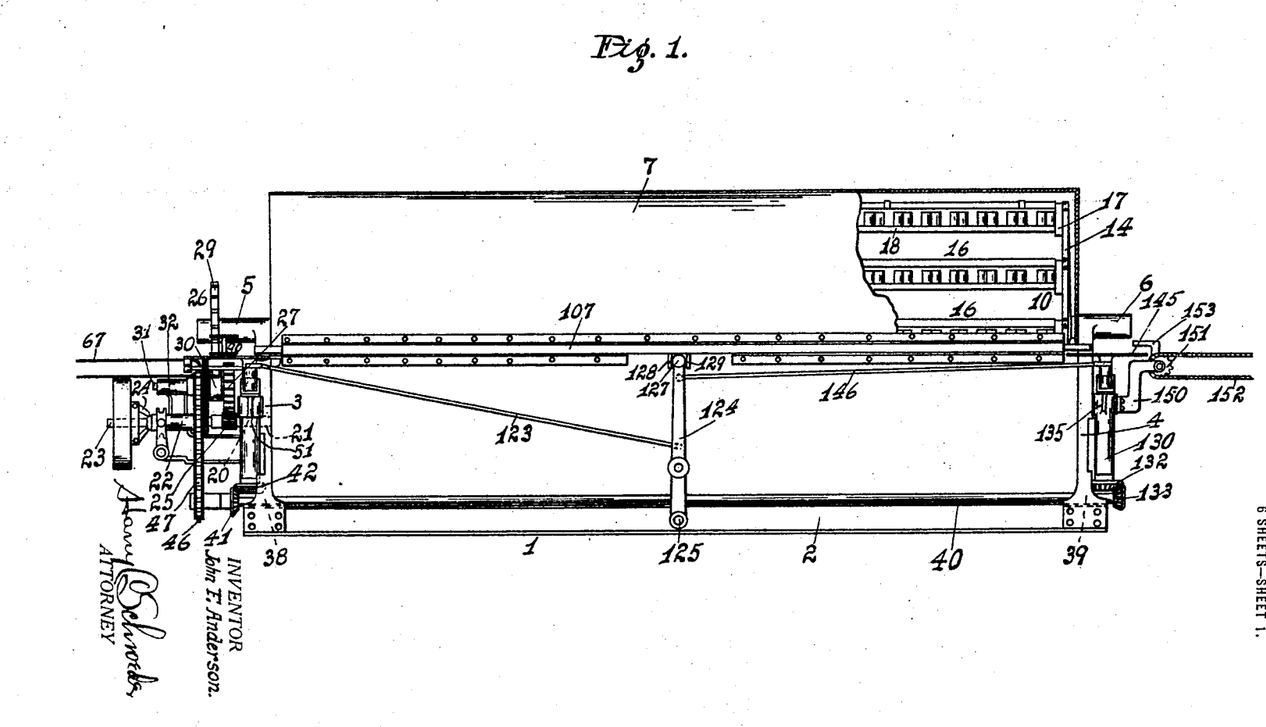
Figure 1 is a side elevation of my exhaust box.
Figure 2:
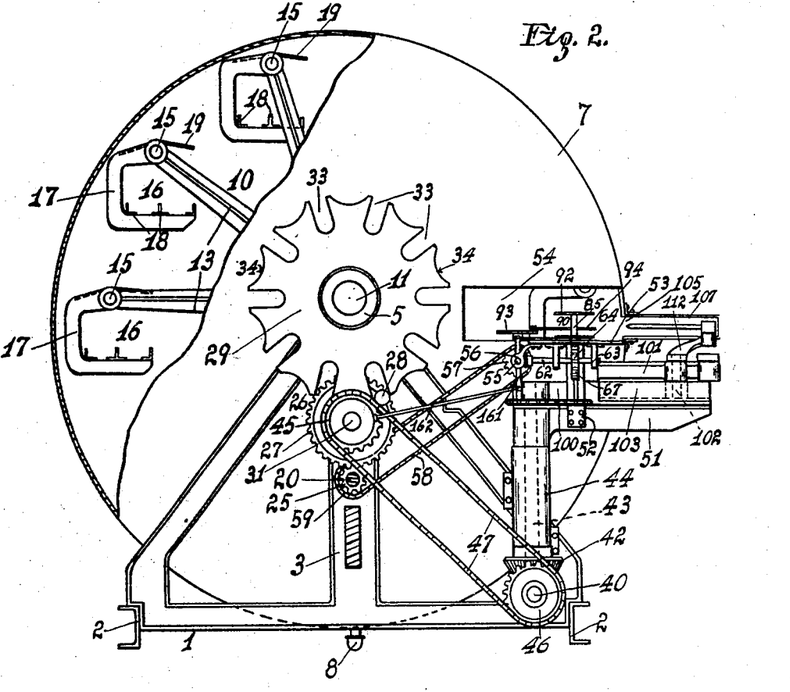
Figure 2 is an end elevation of the intake end of my exhaust box.
Figure 3:
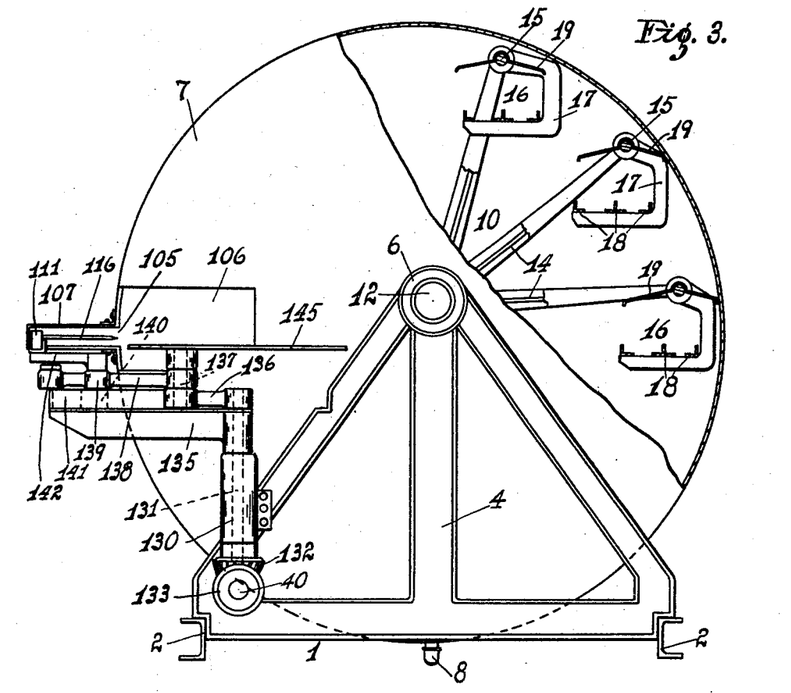
Figure 3 is an end elevation of the delivery end of my exhaust box.
Figure 4:
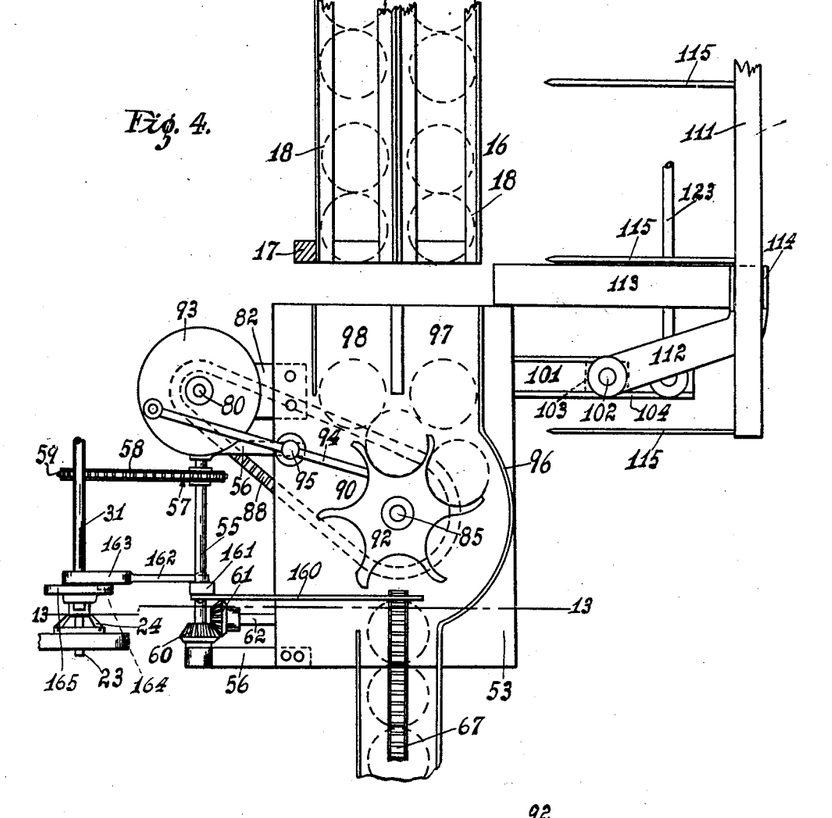
Figure 4 is a plan view of the intake mechanism of my exhaust box.
Figure 5:
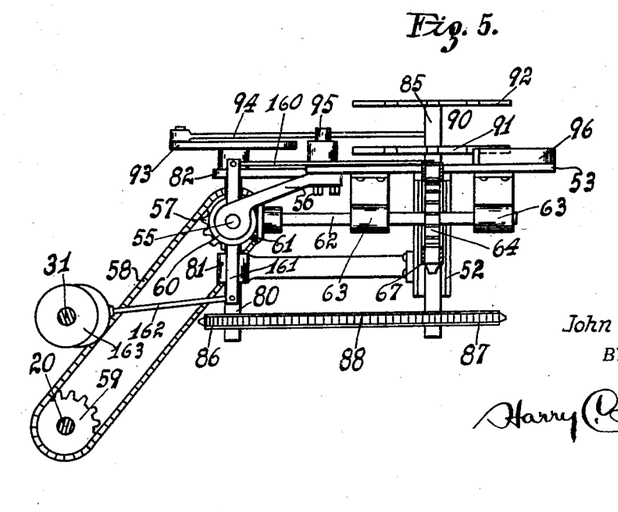
Figure 5 is an end elevation of the intake mechanism.
Figures 6, 7, 8:
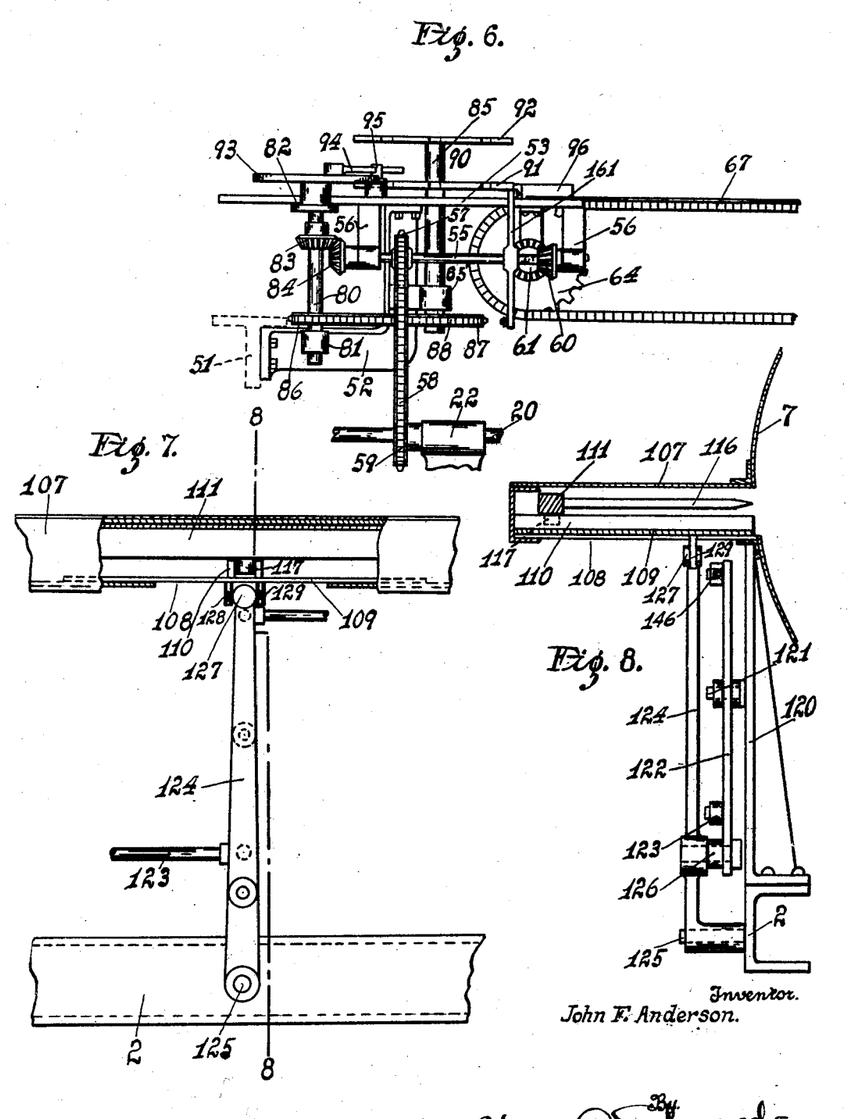
Figure 6 is a side elevation of the intake mechanism.
Figure 7 is a fragmentary side view of the can feed actuating mechanism.
Figure 8 is a vertical view of the can feed actuating mechanism taken on line 8—8 of Figure 7.

On the upper end of shaft 43 is secured a crank 100 to which is connected the inner end of a horizontal lever 101 fulcrumed by pivot 102 to a cross head 103 slidable in a horizontal slideway 104 on the arm 51. The drum 7 is provided with a longitudinal slot 105 in its right side, the lower edge of which slot corresponds with the lower edge of opening 54 and with the lower edge of an opening 106 in the rear or right end wall of the drum. The slot 105 is enclosed by a housing 107 which is secured to the outside of the drum above and below said slot. The housing 107 is provided with an opening 108 in its lower wall midway between its ends and a slide plate 109 slides in the housing on its lower wall over said opening. On the upper side of the plate 109 is a transverse slideway 110 upon which is transversely slidably mounted a feed bar 111 which extends longitudinally through the housing 107. An arm 112 is pivotally mounted by pivot 102 on the lever 101 which arm carries a bridge 113 slidable between the rear end of table 53 and the adjacent end wall of the drum 7. The bridge 113 has a slideway 114 in its outer end in which slides the left end of feed bar 111. Pins 115 project inwardly at right angles from the feed bar 111 and are spaced apart a distance equal to the diameter of two cams. A pin 117 extends from the bar 111 into slideway 110. An upright 120 is secured to the frame beam 2 at the front or right side of the drum 7, on which upright is fulcrumed, by pivot 121, a lever 122. A rod 123 is connected at one end to the outer end of lever 101 and at its other end to the lever 122 below the pivot 121. A lever 124 is fulcrumed by pivot 125 to the frame beam 2 at the right of the drum 7 and is connected by connection 126 to the lower end of lever 122. The lever 124 has a rounded upper end 127 which engages two lugs 128 and 129 depending from the slide plate 109 through the opening 108.

Figure 9:
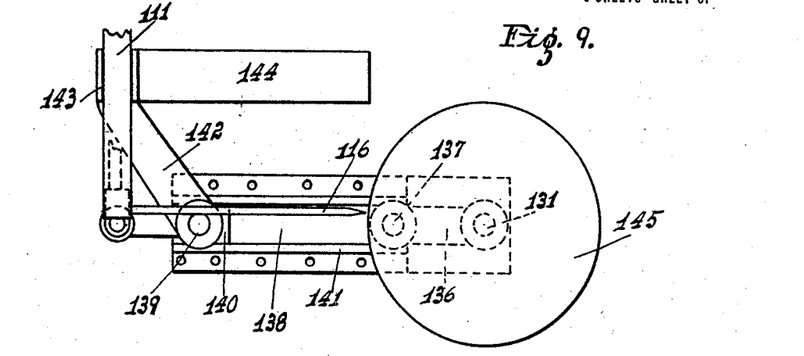
Figure 9 is a plan view of the can delivery mechanism.
Figure 10:
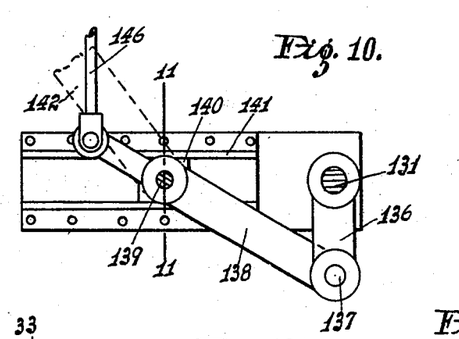
Figure 10 is a view similar to Figure 9 with the parts in a different position.
Figure 11:
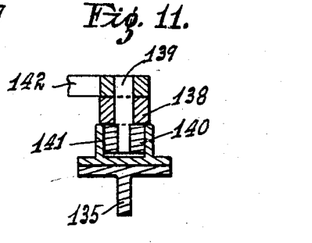
Figure 11 is a sectional view taken on line 11—11 of Figure 10.

On the frame member 3 is a bearing 130 in which is journaled a vertical shaft 131 on the lower end of which is secured a bevel gear 132 which meshes with a bevel gear 133 secured on the rear end of shaft 40. From the upper end of bearing 130 projects an arm 135 horizontally and forwardly of the drum 7. On the upper end of shaft 131 is secured a crank 136 to which is connected by pivot pin 137 the inner end of a horizontal lever 138 which is fulcrumed by a pivot 139 to a cross head 140 slidable in a slideway 141 on the upper side of arm 135. An arm 142 is mounted on pivot 139 on the lever 138 on which arm is a slideway 143 in which slides the rear end of feed bar 111. To the slideway 143 is secured a bridge 144 which slides between the rear end wall of the drum 7 and a receiving table or disk 145 which is secured near its edge to the upper end of pivot 137 on a level with the lower edge of opening 106, the pivot 137 being secured in the crank 136 so that the disk 145 rotates concentrically with shaft 131. A rod 146 is connected at one end to the upper end of lever 122 and at its rear end to the outer end of lever 138. On the arm 135 is secured a bracket 150 on which is journaled a sprocket 151 over which travels a conveyor chain 152. On the bracket 150 is secured a guide 153 which guides the cans from the receiving table or disk 145 onto the conveyor chain 152. A can arrester comprising a rod 160 extends transversely of the table 53 forwardly of the transfer device 90, which rod is connected at its left end to the upper end of a lever 161 fulcrumed on the shaft 55. The lower end of said lever is connected to one end of a rod 162, on the other end of which is a fork 163 which straddles shaft 31. On said fork is a roller 164 which engages a cam 165 on the shaft 31.

The operation of my invention is as follows:

The reel 10 is intermittently driven by the shaft 23 through the medium of the clutch 24, shaft 20, pinion 25 and intermittent movement 26. The conveyor chain 67 is driven by sprocket 64 from shaft 20 through the medium of sprockets 59 and 57 and chain 58, shaft 55, bevel gears 60 and 61 and shaft 62. The filled cans of fruit or other foods are conveyed by conveyor chains 67 onto the table 53 where the first four cans are successively engaged by the transfer device 90. The arrester bar 160 is then moved by cam 165 into the path of the fifth can and holds said can and the succeeding cans on the conveyor chain 67 while the transfer device 90 transfers the first four cans into position where the first and third cans are first ejected from the device by the ejector 94 into the intake end of the guideways 98 and 97 respectively and then the second and fourth cans are correspondingly ejected from the transfer device into said guideways respectively, the second and fourth cans pushing the first and third cans forwardly in said guideways. The transfer device is driven from shaft 55 through the medium of bevel gears 84 and 83, shaft 80, sprockets 86 and 87, chain 88 and shaft 85. The ejector rod 94 is actuated by the disk 93 which is rotated by the shaft 80. The arrester rod 160 holds back the cans on the conveyor chain 67 until two notches pass the chain and the next notch is brought into registration therewith whereupon the cam 165 withdraws said rod from between the conveyor chain and the transfer device to allow the chain to deliver four more cans to the transfer device. When four cans are transferred into the guideways 97 and 98, the bridge 113 is moved between the inner end of the table 53 and the adjacent end of the chamber 7, and the bridge 144 is moved between the disk 145 and the rear end of the chamber, while the feed bar 111 and its pins 115 are moved inwardly, the pin at the forward end of said bar passing behind the rear cans in said slideways, which operation is effected by means of levers 101 and 138 actuated by cranks 100 and 136, said cranks being rotated from the shaft 31 through the medium of the sprockets 45 and 46 and chain 47, bevel gears 41 and 42 and shaft 43, and bevel gears 133 and 132 and shaft 131. The reel 10 at this period being at rest, the feed bar 111 is moved rearwardly by the lever 124, which is actuated through the medium of lever 122 and rod 123 by the lever 101, and the four cans or the two cans in each of the guideways 97 and 98 are moved by the pin 115 at the forward end of the feed bar, across the bridge 113 and into the forward end of the channel bars 18—18 respectively of one of the reel shelves 16. The bridges 113 and 114 are then withdrawn outwardly and the reel rotated until the next shelf 16 is brought into register with table 53, whereupon the next four cans which have been transferred into the guideways 97 and 98 are carried into said shelf as above described. The reel is rotated intermittently and four cans delivered to each succeeding shelf until the first shelf and the first set of cans thereon have rotated a complete revolution and said shaft is again brought into registration with table 53. Another set of cans are then moved onto said first shelf and the pin 115 next to the pin at the forward end of bar 111 engages and pushes the first set of cans forward on the shelf a sufficient distance to make room for the following set. As the reel is rotated the next complete revolution a second set of cans are moved onto the succeeding shelves of the reel, the pin 115 next to the pin at the forward end of the feed bar moving the first set of cans rearwardly on said shelves to make room for the second set. Upon each succeeding revolution of the reel another set of cans is moved onto the shelves and the preceding sets of cans are moved rearwardly on the shelves by the pins 115 between the end pins until the shelves are filled with cans and the foremost sets of cans brought to the rear end of the shelves, whereupon the pin at the rear end of the feed bar engages the foremost sets of cans and successively moves them from the shelves across the bridge 144 which is in its bridging position, onto the rotating receiving table or disk 145 from which the cans are guided by guide 153 onto the conveyor chain 152 which conveys the cans away from the machine.

It is to be understood that in this application cans are referred to but any suitable container or object which may be treated in the apparatus can be substituted for the cans, and by the terms of the claims which refer to cans it is meant any container, object or material which may be treated or handled by the apparatus of this invention. It is also to be understood that one or a plurality of cans may be fed in upon the shelves at the same time and the term "charge" as referred to in the claims shall be considered as meaning one or more cans introduced on the shelves at the same time.

The foregoing is a full, clear and accurate description of my invention and it is to be understood that in this specification and the annexed drawings, the invention is disclosed in the form in which it is considered to be the best, but the invention is not limited to such form because it is capable of being embodied in other forms; and it is to be understood that in and by the claims following this description herein it is intended to cover the invention in whatever form it may embody within the scope thereof.

Having described my invention, I claim:

1. In an exhausting box of the character described, a substantially closed heated chamber, a reel rotatably mounted in said chamber, shelves on said reel, means for rotating the reel, means for feeding the cans to a point where they may be introduced into the chamber, means for subsequently positioning the cans to register with the shelves, and means for moving the positioned cans on to the shelves, means for removing the cans from the shelves and from said chamber.

2. In an exhausting box of the character described, a substantially closed heated chamber, a reel rotatably mounted in the chamber, shelves on said reel, means for rotating the reel, means for feeding cans to a point where they may be introduced into the chamber, means for simultaneously positioning a plurality of cans, means for moving the positioned cans on one end of said shelves in vertical position, and means for moving the cans from the chamber at the other end of shelves after the cans have passed through said chamber.

3. In an exhausting box of the character described, a substantially closed heated chamber, a reel rotatably mounted in the chamber, shelves on said reel, means for rotating the reel, means for feeding the cans to a point where they may be introduced into the chamber, continuously operated means for positioning a plurality of cans to register with the shelves, means for intermittently moving the positioned cans on to one end of the shelves, and means for moving the cans from the chamber at the other end of said shelves after the cans have been passed through said chamber.

4. In a device of the character described, a substantially closed heated chamber, a reel journaled within said chamber, a plurality of shelves pivotally mounted on said reel to maintain their substantially horizontal position during the rotation of said reel, means for rotating said reel, means for introducing cans on the shelves at one end thereof and for progressively feeding said cans along the length of said shelves; and means for receiving the cans from the other end of said shelves as they are moved along the length of the shelves and off of the latter.

5. In a device of the character described, a substantially closed heated chamber, a reel journaled within said chamber, a plurality of shelves pivotally mounted on said reel to maintain their substantially horizontal position during the rotation of said reel, means for rotating said reel, means for introducing a predetermined number of cans on the shelves at one end thereof, said number being less than the capacity of said shelves, means for progressively feeding the cans along the length of said shelves when each new set of cans is introduced on the shelves, and means for removing a predetermined number of cans from the other end of said shelves while other cans are being introduced upon the opposite end of said shelves.

6. In an exhaust box, a heated chamber, a reel mounted in said chamber, shelves on said reel, means for intermittently rotating said reel, a table, means for conveying cans onto said table, a spaced feed bar, means for moving said feed bar inwardly and forwardly and backwardly to move the cans into the forward end of the shelves and along and from the rear end of said shelves during the period of rest of said reel.

7. In an exhaust box, a heated chamber, a reel mounted in said chamber, shelves on said reels, means for introducing cans on one end of said shelves during the periods of rest of the reel, means for rotating said reel and shelves, means for moving cans along the shelves, means for removing the cans from the other end of said shelves when they have passed through the chamber, and plates pivoted on said shelves above the cans to prevent condensation of steam in the top of said cans.

8. In an exhaust box, a heated chamber, a reel mounted in said chamber, shelves on said reel, means for intermittently rotating said reel, a table, means for conveying the cans onto said table, a feed bar, feed members on said bar, a rotatable disk at the rear end of the chamber, a pair of bridges, means for moving said feed bar inwardly and forwardly and backwardly and said bridges one between the inner end of said table and the front end of the chamber and the other between the rear end of said drum and said disk to support the cans from the table across the first bridge into the forward end of the shelves and out of the rear end of said shelves across the other bridge onto said rotating disk during the period of rest of the reel, and means for conveying the cans from said disk.

9. In an exhaust box, a heated chamber, a reel mounted in said chamber, shelves on said reel, means for intermittently rotating said reel, a table, means for conveying the containers onto said table, means for transferring the containers, an ejector for ejecting the cans from said transferring means, a feed bar, feed members on said bar, means for moving said feed bar inwardly and forwardly and backwardly to move the containers into the forward end of the reel shelves and out of the rear end of said shelves during the period of rest of said reel.

10. In an exhaust box, a heated chamber, a reel mounted in said chamber, shelves on said reel, means for intermittently rotating said reel, a table, means for conveying the cans onto said table, means for transferring the cans from said conveying means, an ejector for ejecting the cans from said transferring means, a feed bar, feed members on said bar, a rotatable disk at the rear end of the chamber, a pair of bridges, means for moving said feed bar inwardly and backwardly and forwardly and said bridges one between the inner end of said table and the front end of the drum and the other between the rear end of said drum and said disk, to push the cans from the table across the first bridge into the forward end of the shelves and out of the rear end of said shelves across the other bridge into said rotating disk during the period of rest of the reel, and means for conveying the cans from said disk.

11. In an exhaust box, a heated chamber, a reel mounted on said chamber, shelves on said reel, means for intermittently rotating said reel, a table, means for conveying the cans onto said table, means for transferring the cans from said conveying means, a feed bar, feed members on said bar, a pair of cranks, a pair of slideways, a lever connected to each crank, a cross head slidable in each slideway to which a lever is pivoted, an arm connected to the pivot of each lever, a feed bar slidably mounted at each end on said arms respectively, feed members on said bar, means for rotating said cranks to move said feed bar inwardly and forwardly and backwardly to push the cans into the forward end of the shelves and along and out of the rear end of said shelves during the period of rest of the reel.

12. In an exhaust box, a heated chamber, a reel mounted in said chamber, shelves on said reel, means for intermittently rotating said reel, a table, means for conveying the cans onto said table, means for transferring the cans from said conveying means, a feed bar, feed members on said bar, a pair of cranks, a pair of slideways, a lever connected to each crank, a cross head slidable in each slideway to which a lever is pivoted, an arm connected to the pivot of each lever, a feed bar slidably mounted at each end on said arms respectively, a disk mounted on and rotated by one of said cranks at the rear end of said chamber, a bridge connected to each of said arms, means for rotating said cranks to move said feed bar inwardly and forwardly and backwardly and said bridges one between said table and the forward end of said drum and the other between the rear end of the drum and said disk to cause said pins to push the cans from the table across one bridge into the forward end of said reel shelves and out of the rear end of said shelves across the other bridge onto said disk during the period of rest of the reel, and means for conveying the cans from said disk.

13. In a device of the kind described, a heated chamber, shelves mounted to traverse a path within the chamber, means whereby a charge of articles may be introduced on one end portion of the shelves, and means arranged adjacent the path of travel of said shelves to advance each charge of articles along the length thereof, when each shelf is moved in operative relation with respect to said advancing means.

14. In a device of the kind described, a heated chamber, shelves mounted to traverse a path within the chamber, means whereby successive charges of articles may be each introduced on one end portion of succeeding shelves as they move in their path of travel, and means arranged adjacent the path of travel of said shelves to advance each charge of articles along the length thereof, when each shelf is moved in operative relation with respect to said means.

15. In a device of the kind described, a heated chamber, shelves mounted to traverse a path within the chamber, means whereby successive charges of articles may be each introduced on one end portion of succeeding shelves as they move in their path of travel, and means arranged adjacent the path of travel of said shelves to advance each charge of articles one step along the length thereof, when each shelf is moved in operative relation with respect to said advancing means, whereby the articles on the shelves are moved along the length thereof with a step by step movement.

16. In a device of the kind described, a heated chamber, shelves mounted to traverse a path within the chamber, means whereby successive charges of articles may be each introduced on one end portion of succeeding shelves as they move in their path of travel, means arranged adjacent the path of travel of said shelves to advance each charge of articles along the length thereof, when each shelf is moved in operative relation with respect to said means, and means for actuating said shelves and an operative connection between said actuating means and said article advancing means for causing the latter to operate.

17. In a device of the kind described, a heated chamber, shelves mounted to traverse a path within the chamber, means whereby a charge of articles may be introduced on one end portion of the shelves, means arranged adjacent the path of travel of said shelves to advance each charge of articles along the length thereof, when each shelf is moved in operative relation with respect to said advancing means, a rotating table positioned adjacent the path of travel of said shelves and adapted to align therewith at one point in said path of travel to receive the articles moved from said shelves by said advancing movement, and a conveyor means associated with said table to receive the articles from said table.

In testimony whereof I affix my signature.

JOHN F. ANDERSON.